United States Patent
Miers et al.

(10) Patent No.: US 12,461,262 B2
(45) Date of Patent: Nov. 4, 2025

(54) CLASSIFYING GEOLOGIC FEATURES IN SEISMIC DATA THROUGH IMAGE ANALYSIS

(71) Applicant: ExxonMobil Technology and Engineering Company, Spring, TX (US)

(72) Inventors: Glenn K. Miers, Houston, TX (US); Dennis C. Furlaneto, The Woodlands, TX (US); Brian D. Hughes, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 335 days.

(21) Appl. No.: 18/000,732

(22) PCT Filed: Jun. 9, 2021

(86) PCT No.: PCT/US2021/070678
§ 371 (c)(1),
(2) Date: Dec. 5, 2022

(87) PCT Pub. No.: WO2021/258096
PCT Pub. Date: Dec. 23, 2021

(65) Prior Publication Data
US 2023/0213671 A1    Jul. 6, 2023

Related U.S. Application Data

(60) Provisional application No. 62/705,282, filed on Jun. 19, 2020.

(51) Int. Cl.
G01V 1/30     (2006.01)
G06N 3/08     (2023.01)
G01V 1/28     (2006.01)

(52) U.S. Cl.
CPC ............... *G01V 1/301* (2013.01); *G06N 3/08* (2013.01); *G01V 1/288* (2013.01); *G01V 2210/64* (2013.01)

(58) Field of Classification Search
USPC .......................................... 702/14
See application file for complete search history.

(56) References Cited

U.S. PATENT DOCUMENTS 9,022,129 B2 * 5/2015 Dobin ..................... G06T 7/30
                                                  702/14
2019/0064378 A1 * 2/2019 Liu ......................... G01V 1/28
(Continued)

OTHER PUBLICATIONS

Ying Jiang, "Detecting Geological Structures in Seismic vols. Using Deep Convolutional Neural Networks", RWTH Aachen University, Matriculation No. 350785, Feb. 22, 2017, 76 pages.

*Primary Examiner* — Paul D Lee
(74) *Attorney, Agent, or Firm* — Exxon Mobil Technology and Engineering Company—Law Department

(57) ABSTRACT

Aspects of the technology described herein identify geologic features within seismic data using modern computer analysis. An initial step is the development of training data for the machine classifier. The training data comprises an image of seismic data paired with a label identifying points of interest that the classifier should identify within raw data. Once the training data is generated, a classifier can be trained to identify areas of interest in unlabeled seismic images. The classifier can take the form of a deep neural network, such as a U-net. Aspects of the technology described herein utilize a deep neural network architecture that is optimized to detect broad and flat features in seismic images that may go undetected by typical neural networks in use. The architecture can include a group of layers that perform aspect ratio compression and simultaneous comparison of images across multiple aspect ratio scales.

9 Claims, 9 Drawing Sheets

(56) References Cited

U.S. PATENT DOCUMENTS

| | | | |
|---|---|---|---|
| 2019/0087939 A1* | 3/2019 | Hakimuddin | G06T 7/11 |
| 2020/0183031 A1 | 6/2020 | Denli et al. | |
| 2020/0183032 A1* | 6/2020 | Liu | G01V 1/282 |
| 2020/0183035 A1 | 6/2020 | Liu et al. | |
| 2020/0301036 A1* | 9/2020 | Ramfjord | E21B 7/04 |
| 2023/0021210 A1* | 1/2023 | Servais | G01V 1/50 |

* cited by examiner

CLASSIFYING GEOLOGIC FEATURES IN SEISMIC DATA THROUGH IMAGE ANALYSIS

CROSS-REFERENCE TO RELATED APPLICATIONS

This application is the U.S. National Stage Application of the International Application No. PCT/US2021/070678, entitled "Classifying Geologic Features in Seismic Data Through Image Analysis," filed on Jun. 9, 2021, the disclosure of which is hereby incorporated by reference in its entirety, which claims benefit of U.S. Provisional Patent Application Ser. No. 62/705,282, entitled "Classifying Geologic Features in Seismic Data Through Image Analysis," filed Jun. 19, 2020, the disclosure of which is hereby incorporated by reference in its entirety.

FIELD

Automated machine analysis and classification of geologic features in seismic data.

BACKGROUND

Machine learning has been used to detect geologic features in seismic data. However, the existing machine learning technology, such as a convolutional neural network, often misses geologic features of interest. The analysis of seismic data is often attempted using machine learning techniques derived from image analysis and classification of non-seismic data. These existing techniques are not well adapted to identifying the features of interest in seismic data because geologic features are often very different from the visual features found in faces, common real-world objects, and other features used to build and refine machine learning architectures and training methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the technology described herein identify geologic features within seismic data using modern computer analysis. In particular, geologic features identified are interesting to people who study hydrocarbon environments, particularly for oil & gas exploration such as geologists and geophysicists. Many entities have commissioned and collected seismic studies over a long period. Whatever the initial format, the technology described herein analyzes the seismic studies to identify characteristics that are of interest. Geoscientific resources, such as geologists and geophysicists can then be preferentially dispatched to those areas associated with seismic data having interesting characteristics.

An initial step is the creation of training data for the machine classifier. The training data comprises images representing 2D slices from seismic data, paired with a labeled image (e.g., a mask) as to identify points of interest that the classifier should identify within unclassified data. Once the training data is generated, a classifier can be trained to identify areas of interest in unlabeled seismic images.

The classifier can take the form of a deep neural network, such as a U-net. Aspects of the technology described herein utilize a deep neural network architecture that is optimized to detect broad and flat features in seismic images that may go undetected by typical neural networks in use. The architecture can include a group of layers that perform two operations that help identify broad and flat features. The two operations include aspect ratio compression and simultaneous comparison of images across multiple aspect ratio scales. The first operation uses a 1×2 max pooling operation to change the aspect ratio of the image to be 2:1. Various different aspect ratios can be produced and analyzed, such as a 2:1, 4:1, 8:1 ratio of height to width by applying this max pooling operation several times. In one aspect, the "height" value (which can be seen as the number of horizontal rows of pixels in the image) and corresponds to the underground depth in the seismic image, remains constant, while the width is reduced. Other layers in the architecture process features at a 1:1 ratio.

The 1×2 max pooling operations allow the network to transform seismic images to different aspect ratio scales, which in turn allows for the elongation of certain geologic features of interest to be removed to different extents, thus allowing for the network to be provided with different viewpoints of the training data and allowing for a better determination of what constitutes a feature of interest. Bumps are one example of a geologic feature of interest that the technology described herein was tested upon.

The second operation is the mixing of the network outputs from the three aspect ratios in the network, i.e., 4:1, 2:1 and 1:1 height to width ratios. The network outputs may be produced at the three different aspect ratios in the network. Following this, each narrower tensor (e.g., 2:1 or 4:1) is successively stretched back through 2D convolution transpose operations to match the scales of the wider aspect ratio of the network outputs in previous tiers, and these outputs are then added together allowing the network to digest information from multiple aspect ratios simultaneously. For example, a single layer may use as input the output from a 1:1 ratio layer and a 1:2 ratio layer simultaneously due to the layer outputs being combined through summation, or through some other method.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
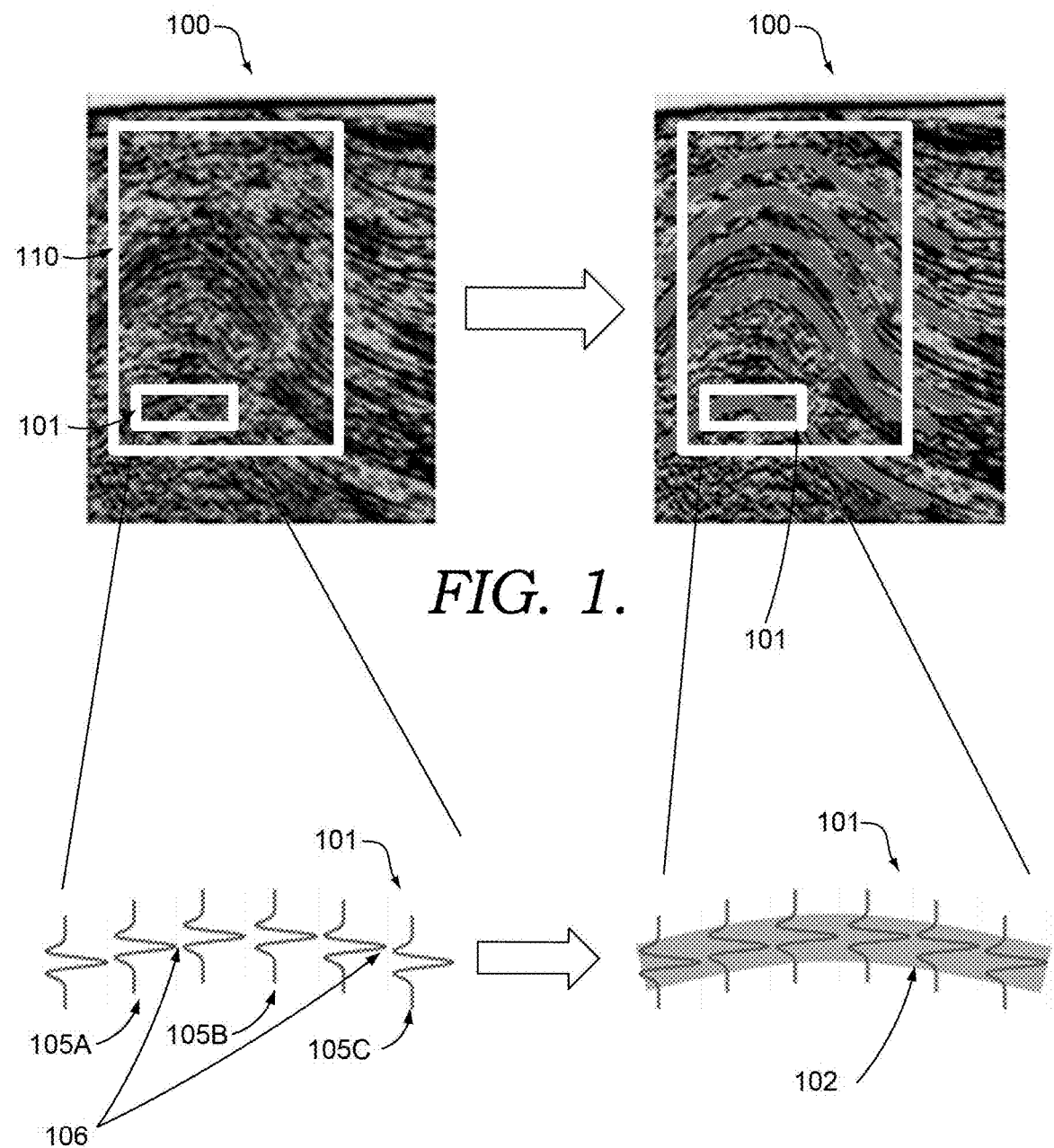
FIG. 1 is a block diagram of an example of seismic data image and seismic label for use with the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein identify geologic features within seismic data using modern computer analysis. In particular, geologic features identified are interesting to people who study hydrocarbon environments, particularly for oil & gas exploration. Many entities have commissioned and collected seismic studies over a long period. Whatever the initial format, the technology described herein analyzes the seismic studies to identify characteristics that are of interest. Geoscientific resources can then be preferentially dispatched to those areas associated with seismic data having interesting characteristics.

An initial step is the creation of training data for the machine classifier. The training data comprises an image of seismic data paired with a label identifying points of interest that the classifier should identify within raw data. Once the training has been created, a classifier can be trained to identify areas of interest in unlabeled seismic images.

The classifier can take the form of a deep neural network, such as a U-net. Aspects of the technology described herein utilize a deep neural network architecture that is designed to detect broad and flat features in seismic images that may go undetected by typical neural networks in use, and also more easily recognizable seismic features at a more perceptible and less elongated aspect ratio. The architecture can include a group of layers that perform two operations that help identify broad and flat features. The two operations include aspect ratio compression and simultaneous comparison of images across multiple aspect ratio scales. The first operation changes the aspect ratio of an image by 1×2 max pooling operations. Various different aspect ratios can be produced and analyzed, such as a 2:1, 4:1, 8:1 ratio of height to width. In one aspect, the "height" value, which corresponds to depth underground, remains constant, while the width is reduced. Other layers in the architecture process features at a 1:1 ratio.

The cascading 1×2 max pooling operations allow the network to process information across three or more different aspect ratio scales, which in turn allows for a broader viewpoint for the network as to what constitutes a feature of interest. In other words, the aspect ratio changes emphasize a bump due to the removal of the elongation of the feature. Bumps are one example of a geologic feature of interest.

The second operation is the mixing of the network output information from the three aspect ratios in the network, i.e., 4:1, 2:1 and 1:1 height to width ratios. The network outputs may be produced at the three different aspect ratios in the network. Following this, each narrower tensor (e.g., 2:1 or 4:1 aspect ratios) is successively stretched back through 2D convolution transpose operations to match the scales of the wider aspect ratio of the outputs of previous tiers, and these outputs are then combined (e.g., using addition) together. This allows the network to digest information from multiple aspect ratios simultaneously. For example, a single layer may simultaneously process the output of a 1:1 ratio layer and a 1:2 ratio layer.

Having briefly described an overview of aspects of the technology described herein, an exemplary operating environment in which aspects of the technology described herein may be implemented is described below in order to provide a general context for various aspects.

Turning now to FIG. 1, an exemplary 2D seismic image 100 is shown along with a feature of interest 101. The 2D seismic image 100 is a cross-section extracted from seismic data, which is itself the result of extensive data processing applied to seismic field records. Seismic surveys consist of a means of generating energy waves that are transmitted into the earth and a means of recording the energy that is returned back from the rock layers. In a reflection seismic survey, the energy emitted from the energy source travels through the earth and is reflected back from the interfaces between different rock types. The reflected energy can be captured by geophones or other means of detection. The reflected energy signals are extensively processed to produce the seismic images such as image 100.

In general, the seismic image can be thought of as a combination of "traces", which are the output of the seismic detection apparatus (possibly after extensive data processing). These are raw waveforms which represent the response of the earth to the seismic signal. In the seismic images here, each column in the seismic image roughly represents a trace. More detail on these waveforms is showing in 105A, 105B and 105C. These waveforms, which are indicated by horizontal changes 106 in the vertical lines, show where the seismic energy has encountered a change in rock properties. Not all of these changes is of interest. In the example shown in FIG. 1, a concave down feature, (known as a bump) has been highlighted. This is an example of a geologic feature of interest.

These areas of interest are labeled 102 by geoscientists or others with the appropriate experience and expertise to identify areas of interest that the machine classifier should be trained to identify. In general, the labels may capture attributes that have a correlation within adjacent traces. This shows a consistent seismic response across an area. The image file and label file may be saved as separate files which differ only in that one is labeled, and the other is not.

Figure 2:
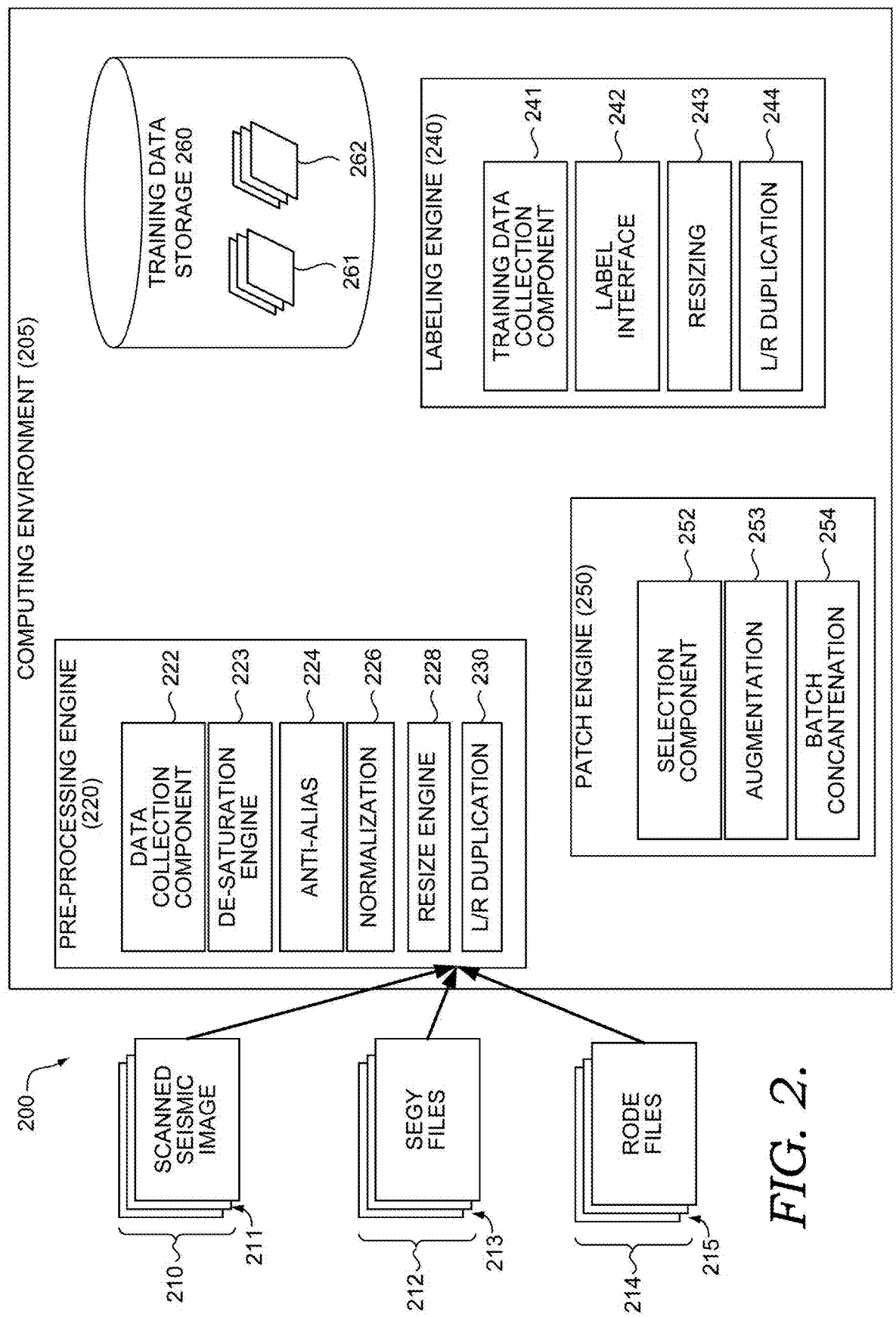
FIG. 2 is a diagram depicting an example computing architecture suitable for implementing generating training data, according to aspects of the present disclosure.

Referring now to FIG. 2, a block diagram is provided showing aspects of an example computing system architecture suitable for generating training data for a machine classifier that analyzes seismic data and designated generally as system 200. System 200 represents only one example of a suitable computing system architecture. Other arrangements and elements can be used in addition to or instead of those shown, and some elements may be omitted altogether for the sake of clarity. Many of the elements described herein are functional entities that may be implemented as discrete or distributed components or in conjunction with other components, and in any suitable combination and location.

Example system 200 includes computing environment 205, which includes a pre-processing engine 220, a labeling engine 240, a patch engine 250, and training data storage 260. The pre-processing engine 220 (including its components 222, 223, 224, 226, 228, and 230), the labeling engine 240 (including its components 242, 243, and 244), and the patch engine 250 (including its components 252, 253, and 254) may be embodied as a set of compiled computer instructions or functions, program modules, computer software services, or an arrangement of processes carried out on one or more computer systems.

In one aspect, the functions performed by components of system 200 are associated with one or more applications, services, or routines. In particular, such applications, services, or routines may operate on one or more computing servers, or be implemented in the cloud. Moreover, in some aspects, these components of system 200 may be distributed across a network, including one or more servers, in the cloud, or may reside on a user device, such as a laptop or desktop computer. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Central processing unit (CPUs), Graphics processing unit (GPUs), Field programmable Gate Arrays (FPGAs), etc. Additionally, although functionality is described herein with regards to specific components shown in example system 200, it is contemplated that in some aspects functionality of these components can be shared or distributed across other components.

Continuing with FIG. 2, exemplary system 200 receives seismic data (e.g., data 211, 213, or 215) as input at data collection component 222. The system 200 processes seismic data to be used with the geologic feature detection process, specifically on bumps. The seismic data is processed by the pre-processing engine 220 to as a first step in generating training data.

Three different groups of seismic data are shown being input to the data collection component 222. These groups illustrate that the system 200 can process a wide variety of seismic data. In one aspect, the seismic data are images of two-dimensional seismic surveys.

The first group of seismic data 210 are scanned. Generally, data 211 and the other data in the first group of seismic data 210 originate as paper documents in a file, library, as microfiche, or some other physical storage. These documents are scanned to create a computer file containing an image of the seismic data. The data may be initially stored as an image in any number of file formats. The seismic images may be in black and white or include color.

The second group of seismic data 212, including data 213, are input to the data collection component 222 in the SEG-Y format. The SEG-Y format is a file format used for storing seismic data. The format is governed by the SEG Technical Standards Committee. Associated file extensions include (but are not limited to) the .sgy and .segy extensions.

The third group of seismic data 214, including data 215, are in the RODE format, which is a file format for the storage of seismic data. The technology described herein is not limited to these three formats.

The pre-processing engine 220 receives seismic data and converts it to a format that is more suitable for a machine classifier to process. The pre-processing engine 220 also reduces variance between different types of seismic data to give the machine classifier a more consistent input. Finally, the pre-processing engine 220 can use an initial set of training data to generate additional training data. The pre-processing engine 220 includes data collection component 222, de-saturation engine 223, anti-aliasing component 224, normalization component 226, resize engine 228, and left/right duplication component 230.

Data collection component 222 receives the seismic data files and manages their processing by the other components of the pre-processing engine 220. The data collection component 222 can communicate data files at various stages of processing to the other components, including the labeling engine 240. Once the seismic data file has been converted into training data, the data collection component 222 can communicate the completed training file to data storage 260, and the labeling engine 240.

The de-saturation engine 223 removes colors from seismic data that includes colors. Typically, some formats, such as SEGY files, do not include color and will not need to undergo the de-saturation process. Colors in seismic images often relate to polarity or other features that do not directly relate to sought after geologic structures. Removing the colors gives the machine classifier one less signal to consider and can produce a more accurate classification since color was found not to strongly correlate to identifying geologic structures of interest. Essentially, removing the colors removes noise from the image signal being processed by the classifier.

Anti-aliasing component 224 applies a filter to the seismic images before resizing. In order to prevent artifacts from being introduced into the images during the resizing process, an anti-aliasing filter (such as a Gaussian filter) can be utilized. The Gaussian filter may need not be used if the image does not require resizing. In general, the anti-alias filter will blur sharp edges within the image and reduce noise present within the image, and will prevent high frequencies from producing aliasing noise after resizing.

The normalization component 226 provides a contrast adjustment to some images. In one aspect, a histogram equalization process can be used to normalize the contrast in the image. Many of the images ultimately classified for interesting geological structures are scans of older seismic data that are old, low-contrast, and very noisy. In many cases, these data sets have been stored for years on microfiche slides. Thus, many of the scans are very low contrast with backgrounds and foregrounds that are both bright or both dark. The normalization component 226 makes contrast adjustments before further processing of the images takes place. Histogram equalization usually increases the global contrast of images, especially when the usable data of the image is represented by close contrast values. Through this adjustment, the intensities can be better distributed on the histogram. This allows for areas of lower local contrast to gain a higher contrast. Histogram equalization accomplishes this by effectively spreading out the most frequent intensity values. This histogram equalization process can be adaptive or non-adaptive.

The resize engine 228 resizes the seismic data to common size. In one aspect, the entire image is resized in both dimensions, while retaining the aspect ratio of the original image. Pixel interpolation is one method of resizing.

The left/right duplication component 230 takes the original seismic image and makes a copy of it after flipping the pixels from left to right across the vertical center line of the image. Both of these versions of the files are stored to be used with the next step in the workflow, which is patch generation and data augmentation. Essentially, the flipping process doubles the number of training images available.

The labeling engine 240 allows a person to label points of interest within seismic data. The labeling engine 240 includes a training data collection component 241, label interface 242, a resizing component 243, and a left/right duplication component 244.

The data collection component 241 for the labeling engine receives seismic images from the data collection component 222, (or from other components in the pre-processing engine 220) in the pre-processing engine and manages their use in the labeling process. The data collection component 241 manages data movement in the labeling engine 240 before and after geoscientist labeling takes place on the data, and also manages movement of the labeled data back to the training data storage 260.

The label interface 242 provides an interface through which users can annotate images to indicate where features of interest occur within the images. These annotations become labels. The interface may comprise a graphical user interface on which the seismic image is output and input mechanism for the user to select a portion of the image that contains the feature of interest. In one aspect, the labels are designed to be overly inclusive meaning they include both the feature of interest and some surrounding area. Exemplary labels can be found in FIG. 1.

Labels can be added to images at various stages of processing. For example, a label could be added to a raw image communicated to the data collection component 241. Alternatively, the label could be added after various operations, such as desaturation and normalization have occurred.

The human created labels can be transformed to 2D matrices of the same size as the training images, where each pixel is presented by a position in the matrix, and for each pixel, if the pixel is over a feature marked interesting it will be labeled with a 1. If the pixel is not over a region marked interesting, then it will be labeled with a zero.

Some seismic data may not include any features of interest. For these images, the system will create an array of zeros with shape matching the corresponding seismic image, i.e., m pixels by n pixels to be used as the label. The array of zeros will indicate no portion of the seismic image contains a feature of interest.

Next, we fill in the mask pixels as follows: Choose a cube C in RGB color space, say ([220, 255], [0, 25], [220, 255]). The cube C should be selected to include the color used to generate the label, while not including any colors of the underlying seismic image if possible. Some seismic images can include annotations in various colors. The original label color should be selected to be different from the color used in any annotations. Any pixel in the label file that has a color that falls within the specified cube will be given a label of 1. Any pixel that does not have a color that falls within the specified cube will be given a label of 0. This method preserves the label through JPEG compression and other operations that might occur.

The resizing component 243 resizes the labels in proportion to the change made to corresponding images being resized by the resizing engine 228, if any.

The left/right duplication component 244 works in conjunction with the left/right duplication component 230 to flip the label in the same way the images are flipped. This causes the flipped label to correspond to the features of interest in the transformed image. The label file has now been created and can be saved into training data storage 260 for access by the patch engine 250.

The patch engine 250 generates training data instances that end up being the final input that is presented to the classifier during the training phase. The training input comprises a large number of individual training instances. Each training data instance comprises a seismic image file and a corresponding label file. A purpose of the patch engine 250 is to generate training images and corresponding labels having consistent dimensions. For example, the training images could be 512×512. The original seismic images can come in a variety of different sizes and multiple training data instances can be generated from a single seismic image. The training data instances may also be described as patches. The patch engine 250 comprises a selection component 252, an augmentation component 253, and a batch concatenation component 254.

The selection component 252 selects a portion of a seismic image. The corresponding portion of a label is also selected. The selection component repeats the selection process until the desired number of patches have been selected from the training data storage 260. The patches can overlap. In other words, the same portion of the seismic image can be found in more than one patch. While overlap is possible, each seismic image should be distinct. In this way, the training data comprises a plurality of unique training data instances. The selection component 252 repeats this process with each seismic image provided to it.

Different selection sizes are possible, but the selection size should be chosen after giving consideration to label sizes. In general, the labels will be elongated with a longer width than height. In this case, the height corresponds to a depth underground. The selection size should be chosen to capture the entire width of many labels. In one aspect, the selection width is selected to be greater than the average width of all labels generated by the labeling engine 240. In another aspect, the selection width is selected to be greater than the widest label. Other selection methodologies are possible.

The augmentation component 253 adjusts patches corresponding to seismic image patches and label patches. There is a common need in machine learning to make the model robust in the face of minor changes to the images being used for training. In one aspect, this can be implemented as applying various transformations to the image and label patches such as (but not limited to): Adding noise to the images or labels, rotating the images and label patches through a random angle, translating the images some distance in the horizontal and/or vertical directions, or applying skewing transformations to the image and label patches.

In many cases, the labels will be too large to fit within a single selected patch. This can result in partial labels that cover portions of seismic events that are too small to convey any geologic meaning. Training the model on these truncated labels would cause the final network to identify incomplete features, which may be undesirable. If a label fits entirely within the selected area, then no other action need be taken. If, on the other hand, a label is truncated by the patch selection, meaning a first portion of the label is within the selection area and a second portion extends out of the selection area then removal of the entire connection portion of that label will need to be edited. This process can include deleting an individual portion of the label from the training instance when more than a threshold amount of the label extends out of the selection area. The threshold amount can be the ratio of the label area remaining within the selected area to the area of the original label. If this ratio is too small, the portion of the label that has been truncated by the patch selection process is deleted from the current patch before the label patch is passed through the rest of the workflow. Deleting the label in one patch selection will not delete the label from a different patch selection which contains a sufficient portion of the label. Each selection area and associated label is evaluated independently. The label editing process is illustrated in FIGS. 3 and 4.

The batch concatenation component 254 collects instances of training data for a training set used when training the classifier. The training images 261 and the training labels 262, which form the final training data instances, are stored in data storage 260.

Figure 3:
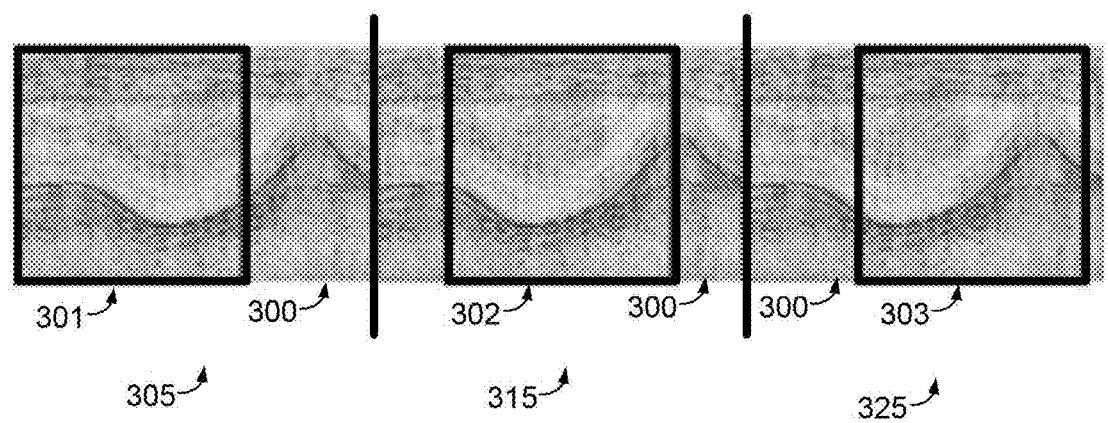
FIG. 3 is a diagram depicting a patch extraction, in accordance with an aspect of the technology described herein.

Turing now to FIG. 3, the selection of three different patches (or selection areas) from a seismic image 300 is illustrated. Different methods of selection patches can be used at different parts of the process. For example, training data may be generated using a first selection method, while the production model uses a different method. In one aspect, the production model uses a fixed sized frame and fixed overlap. In one aspect, the training data is generated using random sizes and/or overlaps, including possibly no overlap. The use of random sizes and/or random overlaps when generating training images can increase the model's robustness. All three frames 305, 315, and 325 show the same seismic image 300. In the left frame 305, the box to the left illustrates the bounds of the first selected area 301. In the middle frame 315, the box illustrates the bounds of the second selected area 302. In the right frame 325, the box illustrates the bounds of the third selected area 303. As can be seen, the adjacent selection area overlap by approximate 66%. Therefore, about 66% of the first selected area 301 is with the second selected area 302. Aspects of the technology are not limited to use with 66% overlap and other overlaps, such as 10%, 20%, 30%, 40%, 45%, 50%, 60%, 70%, 80%, 90%, or 95%, could be used.

Figure 4:
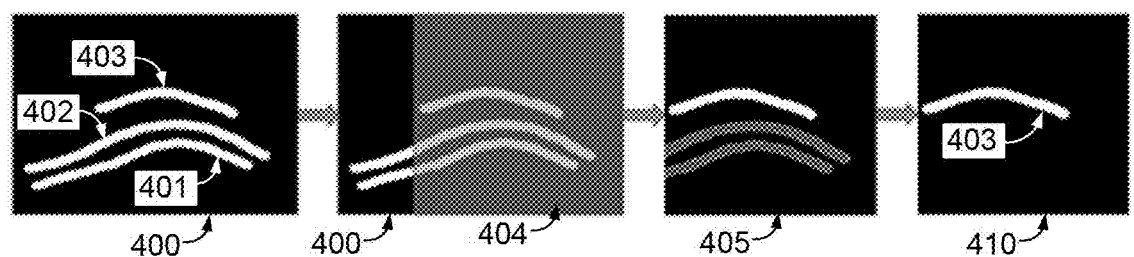
FIG. 4 is a diagram depicting a label augmentation in view of a patch extraction, in accordance with an aspect of the technology described herein.

Turing now to FIG. 4, the editing of a label is illustrated. The label file 400 includes a first label 401, a second label 402, and a third label 403. All three of these labels fall within selection area 404, at least in part. As can be seen, the third label 403 is entirely within the selection area 404, while portions of the first label 401 and second label 402 are truncated by the selection area. The new label image 405, which matches an underlying selection area in a seismic image, initially includes the three labels, or portions of labels, within the selection.

The editing process applies a threshold based on the ratio of the portion of the label outside of the selection area to the overall size of the full label. Various ratios can be used. For example, the ratio of the portion inside the selected area to the portion outside. The ratio could be set at any suitable value, such as 10:1, 5:1, and/or the like.

In this example, the first label 401 and the second label 402 both fail the threshold ratio and are deleted. The final label file 410 only includes the third label 403.

Figure 5:
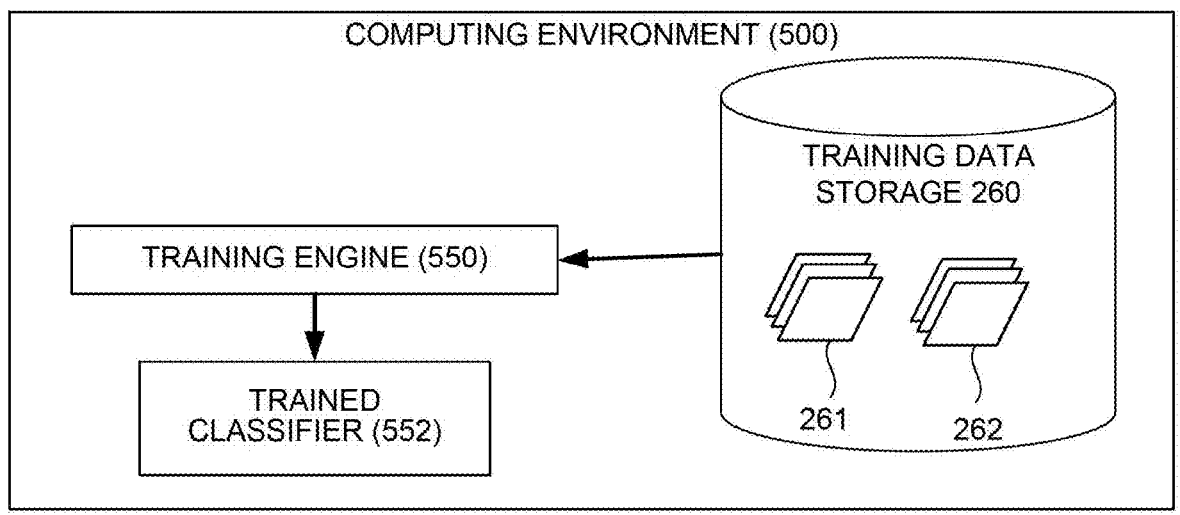
FIG. 5 is a diagram depicting an example computing architecture suitable for training a machine classifier to identify interesting features in seismic data, according to aspects of the present disclosure.

Turning now to FIG. 5, a block diagram is provided showing aspects of an example computing system architecture suitable for training data a machine classifier that analyzes seismic data and designated generally as system 500. System 500 represents only one example of a suitable computing system architecture. Other arrangements and elements can be used in addition to or instead of those shown, and some elements may be omitted altogether for the sake of clarity. Many of the elements described herein are functional entities that may be implemented as discrete or distributed components or in conjunction with other components, and in any suitable combination and location.

Example system 500 includes training engine 550, trained classifier 552, and a training data storage 260. These components may be embodied as a set of compiled computer instructions or functions, program modules, computer software services, or an arrangement of processes carried out on one or more computer systems.

The training engine 550 takes the training data patches, which include seismic training images 261 and corresponding training labels 262 as input to build a trained classifier 552. Once trained, the classifier 552 can identify geologic areas in interest in unlabeled training data.

The classifier 552 may use a neural network, such as a U-net, which is a type of convolutional neural network. As used herein, a neural network comprises at least three operational layers. The three layers can include an input layer, a hidden layer, and an output layer. Each layer is comprised of neurons. In this particular case, the input layer neurons receive an image of the document and pass data derived from the image to neurons in multiple hidden layers. Neurons in the hidden layers pass on the results of their computations to the additional layer, until the results get to the output layer, generally a softmax layer for multi-classification problems such as image classification. The output layer then produces probability values for each individual pixel. Different types of layers and networks connect neurons in different ways.

Neurons have an intrinsic activation function that computes its output given an input (a vector of numbers) that is multiplied by another vector of numbers (called weights). The weights are the adjustable parameters that cause a neural network to produce a correct output given previous known matches between input-output, and are determined by the training process. For example, if a training image showed a geologic feature of interest, then the correct output would be for the network to show the labels as a geoscientist had initially labeled the training data. Once trained, the weight associated with a given neuron can remain fixed. The other data passing between neurons can change in response to a given input (e.g., seismic image to be searched for geological features of interest). Retraining the network with additional training images can update one or more weights in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), such as a U-net, recursive neural networks, recurrent neural networks, and long short-term memory (LSTM) (which is a type of recursive neural network). The training implementation described subsequently uses a convolutional neural network, but aspects of the technology are applicable to other types of machine learning.

In each type of deep learning model, training is used to fit the model to the training data. In particular, weights associated with each neuron in the model can be updated through training. Originally, the initial model can comprise random weight values that are adjusted during training. Training in this context is done in multiple iterations, and each iterations comprises multiple steps: a forward pass, a loss function calculation and backpropagation, where the weights are updated given errors made by the neural network during training. This process is repeated for multiple batches of training images. The goal is to update the weights of each neuron (or other model component) to cause the model to produce an output that maps to the correct segment label for as many images as possible. The training data comprises labeled images. For example, a seismic image with each area of interest labeled may serve as training data. The training data may be annotated by humans. Each labeled image is input to the model and used to train it. Once a sufficient number of training images are fed to the model used by classifier 552 and the model stops improving or improves slowly during training, then the training can stop. The model can then be used to classify unlabeled images (e.g., documents not in the training set).

Figure 6:
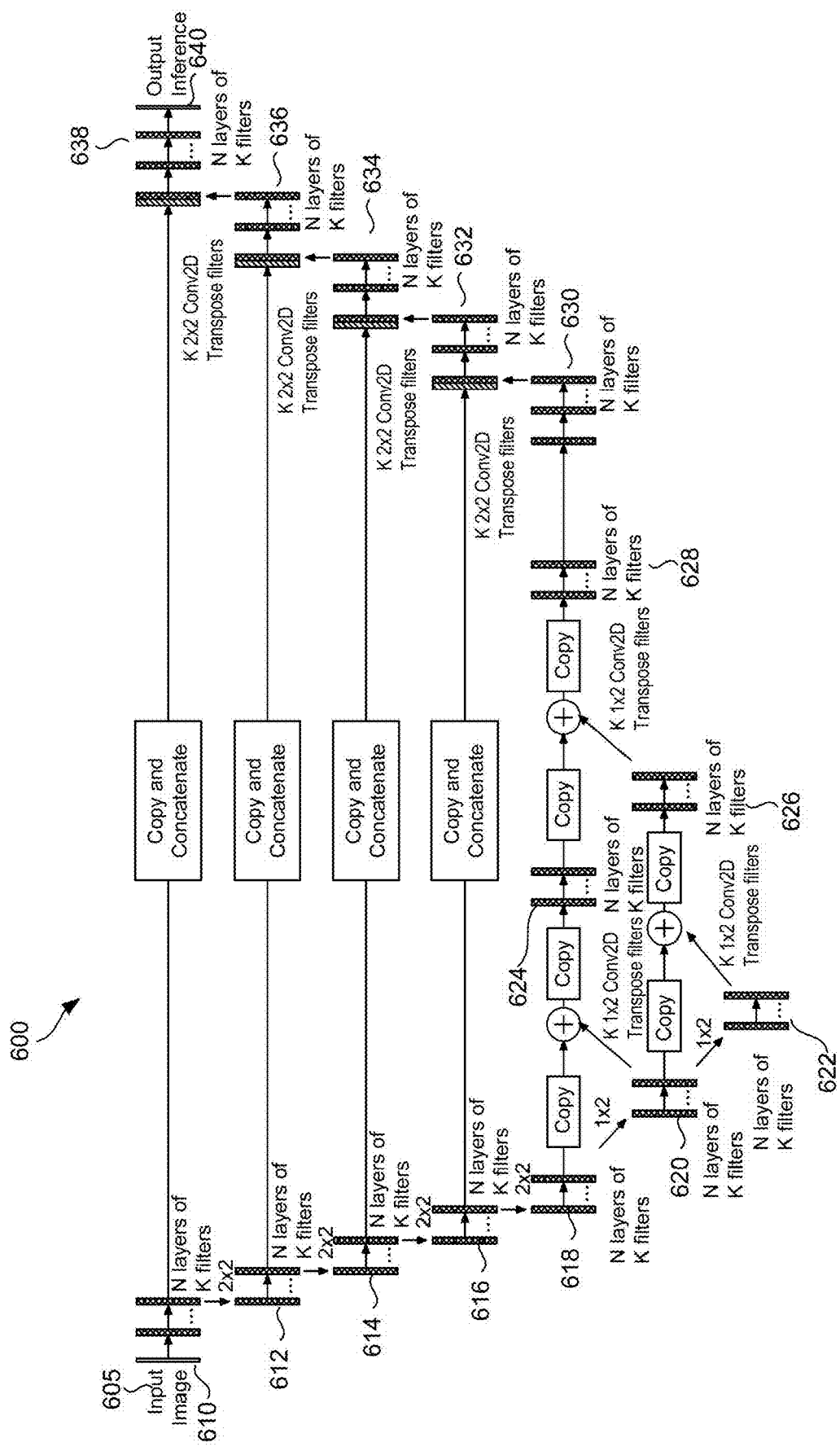
FIG. 6 is a diagram depicting a U-net architecture suitable for identify interesting features in seismic data using a machine classifier, according to aspects of the present disclosure.

Turning now to FIG. 6, an exemplary U-net classifier 600, which may be used to classify seismic images, is provided according to an aspect of the technology described herein. The U-Net classifier 600 comprises 15 layer groups depicted in seven tiers. The image 605 to be classified (or training images) is input into the first layer group 610 on the first tier. The first layer group 610 is a set of convolutional layers comprising a series of layers which are applied successively. Each additional layer in this layer group receives the output of the layer preceding it as input and generates a corresponding output. The output of the first layer group 610, which can be described as a tensor, is copied and communicated as input to the first layer of the fifteenth layer group 638 and is also passed through a 2×2 max pooling operation, the result of which operation serves as input to the second convolutional layer group 612.

As with the first layer group 610, the second convolutional layer group 612 comprises a plurality of layers with each layer performing an operation on the input tensor to generate an output. The combined output of the layers in the second convolutional layer group 612 is a tensor that is copied and communicated as input to the fourteenth layer group 636 and is also passed through a 2×2 max pooling operation, the result of which operation serves as input to the third convolutional layer group 614.

The third convolutional layer group 614 comprises a plurality of layers with each layer performing an operation on the input tensor to generate an output. The combined output of the layers in the third convolutional layer group 614 is a tensor that is copied and communicated as input to the thirteenth layer group 634 and is also passed through a 2×2 max pooling operation, the result of which operation serves as input to the fourth convolutional layer group 616.

The fourth convolutional layer group 616 comprises a plurality of layers with each layer performing an operation on the input tensor to generate an output. The combined output of the layers in the fourth convolutional layer group 616 is a tensor that is copied and communicated as input to the twelfth layer group 632 and is also passed through a 2×2 max pooling operation, the result of which operation serves as input to the fifth convolutional layer group 618.

The fifth convolutional layer group 618 comprises a plurality of layers with each layer performing an operation on the input tensor to generate an output. The combined output of the layers in the fifth convolutional layer group 618 is a tensor that is copied and communicated as input to the eighth layer group 624 and is also passed through a 1×2 max pooling operation, the result of which operation serves as input to the sixth convolutional layer group 620.

The sixth convolutional layer group 620 comprises a plurality of layers with each layer performing an operation on the input tensor to generate an output. The combined output of the layers in the sixth convolutional layer group 620 is a tensor that is passed through a 1×2 2D convolutional transpose operation and communicated as input to the eighth layer group 624. The tensor generated by the sixth convolutional layer group 620 is also passed through a 1×2 max pooling operation, the result of which operation serves as input to the seventh convolutional layer group 622. An unchanged version of the output from this later is also provided as input to layer group 626.

The seventh convolutional layer group 622 comprises a plurality of layers with each layer performing an operation on the input tensor to generate an output. The combined output of the layers in the seventh convolutional layer group 622 is a tensor that is passed through a 1×2 2D convolutional transpose operation and communicated as input to the ninth layer group 626.

The eighth convolutional layer group 624 comprises a plurality of layers with each layer performing an operation on the input tensor to generate an output. The combined output of the layers in the eighth convolutional layer group 624 is a tensor that is communicated as input to the tenth convolutional layer group 628. The input tensor to the eighth convolutional layer group 624 is formed by combining (by summation or other methods) the output tensor from the fifth convolutional layer group 618 and the output from the sixth convolutional layer group 620 after the output from the sixth convolutional layer group 620 undergoes a 1×2 2D convolutional transpose operation.

The ninth convolutional layer group 626 comprises a plurality of layers with each layer performing an operation on the input tensor to generate an output. The combined output of the layers in the ninth convolutional layer group 626 is a tensor that is communicated as input to the tenth convolutional layer group 628 after the output undergoes a 1×2 2D convolutional transpose operation. The input tensor to the ninth convolutional layer group 626 is formed by combining (by summation or other methods) the output tensor from the sixth convolutional layer group 620 and the output from the seventh convolutional layer group 622 after the output from the seventh convolutional layer group 622 undergoes a 1×2 2D convolutional transpose operation.

The tenth convolutional layer group 628 comprises a plurality of layers with each layer performing an operation on the input tensor to generate an output. The combined output of the layers in the tenth convolutional layer group 628 is a tensor that is communicated as input to the eleventh convolutional layer group 630. The input tensor to the tenth convolutional layer group 628 is formed by concatenating the output tensor from the eighth convolutional layer group 624 and the output from the ninth convolutional layer group 626 after the output from the ninth convolutional layer group 626 undergoes a 1×2 2D convolutional transpose operation.

The eleventh convolutional layer group 630 comprises a plurality of layers with each layer performing an operation on the input tensor to generate an output. The combined output of the layers in the eleventh convolutional layer group 630 is a tensor that is communicated as input to the twelfth convolutional layer group 632 after it undergoes a 2×2 2D convolutional transpose operation.

The twelfth convolutional layer group 632 comprises a plurality of layers with each layer performing an operation on the input tensor to generate an output. The input tensor for the twelfth convolutional layer group 632 is formed by concatenating the output tensor from the fourth convolutional layer group 616 and the output from the eleventh convolutional layer group 630 after it undergoes a 2×2 2D convolutional transpose operation. The combined output of the layers in the twelfth convolutional layer group 632 is a tensor that is communicated as input to the thirteenth convolutional layer group 634 after undergoing a 2×2 2D convolutional transpose operation.

The thirteenth convolutional layer group 634 comprises a plurality of layers with each layer performing an operation on the input tensor to generate an output. The input tensor for the thirteenth convolutional layer group 634 is formed by concatenating the output tensor from the third convolutional layer group 614 and the output from the twelfth convolutional layer group 632 after it undergoes a 2×2 2D convolutional transpose operation. The combined output of the layers in the thirteenth convolutional layer group 634 is a tensor that is communicated as input to the fourteenth convolutional layer group 636 after it undergoes a 2×2 2D convolutional transpose operation.

The fourteenth convolutional layer group 636 comprises a plurality of layers with each layer performing an operation on the input tensor to generate an output. The input tensor for the fourteenth convolutional layer group 636 is formed by concatenating the output tensor from the second convolutional layer group 612 and the output from the thirteenth convolutional layer group 634 after it undergoes a 2×2 2D convolutional transpose operation. The combined output of the layers in the fourteenth convolutional layer group 636 is a tensor that is communicated as input to the fifteenth convolutional layer group 638 after it undergoes a 2×2 2D convolutional transpose operation.

The fifteenth convolutional layer group 638 comprises a plurality of layers with each layer performing an operation on the input tensor to generate an output. The input tensor for the fifteenth convolutional layer group 638 is formed by concatenating the output tensor from the first layer group 610 and the output from the fourteenth convolutional layer group 636 after it undergoes a 1×2 2D convolutional transpose operation. The combined output of the layers in the fifteenth convolutional layer group 638 is the classification output and can take the form of a file that identifies geologic areas of interest within the seismic label image 405 input to the system.

Layer groups five 618, six 620, seven 622, eight 624, nine 626, and ten 628 work together to identify broad and flat features within a seismic image that might elude detection by a traditional U-net.

These layer groups perform two operations that help identify broad and flat features. The two operations include aspect ratio compression and simultaneous comparison of images across multiple aspect ratio scales. The first operation changes the aspect ratio of an image by 1×2 max pooling operations. These operations are performed by the fifth convolutional layer group 618 and the sixth convolutional layer group 620. The first 1×2 max pooling operation performed by the fifth convolutional layer group 618 produces a tensor with a 2:1 ratio of height to width. The second 1×2 max pooling operation performed by the sixth convolutional layer group 620 produces a tensor with a 4:1 ratio of height to width. In one aspect, the "height" value of the tensor, which corresponds to depth underground, remains constant, while the width is reduced. All previous layers in the U-net keep the height to width ratios 1:1, by performing 2×2 max pooling operations.

This allows the network to process information across three different aspect ratio scales, which in turn allows for a broader viewpoint for the network as to what constitutes a feature of interest. In other words, the aspect ratio changes emphasize a bump due to the removal of the elongation of this feature. Bumps are an example of a geological feature of interest.

The second operation is the mixing of the network output information from the three aspect ratios in the network, i.e., 4:1, 2:1 and 1:1 height to width ratios. The network outputs are produced at the three different aspect ratios in the network by the output of the fifth layer group 618, the sixth layer group 620, and the seventh layer group 622. Following this, each narrower tensor (e.g., 2:1 or 4:1) is successively stretched back through 2D transpose operations to match the scales of the wider aspect ratio of the outputs of previous tiers, and these outputs are then added allowing the network to digest information from multiple aspect ratios simultaneously. For example, the eighth convolutional layer group 624 processes the output from the fifth layer group 618 (1:1 ratio) and the sixth layer group 620 (2:1 ratio). Similarly, the ninth convolutional layer group 626 processes the output from the sixth layer group 620 (2:1 ratio) and the seventh layer group 622 (4:1 ratio). Finally, the tenth convolutional layer group 628 processes the output of the ninth convolutional layer group 626 and the eighth convolutional layer group 624.

Figure 7:
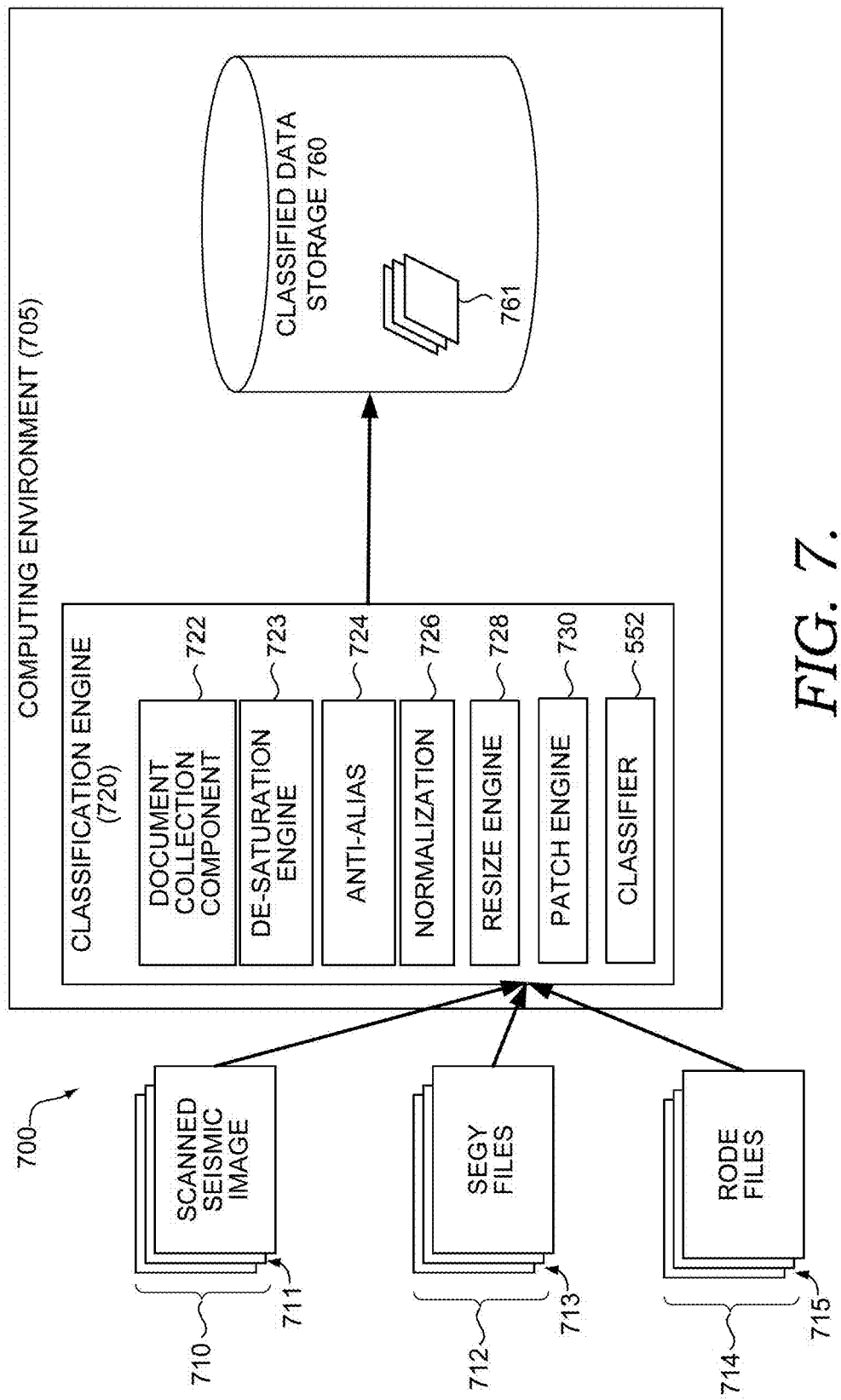
FIG. 7 is a diagram depicting an example computing architecture suitable to identify interesting features in seismic data using a machine classifier, according to aspects of the present disclosure.

Turning now to FIG. 7, a block diagram is provided showing aspects of an example computing system architecture suitable for using a machine classifier to identify geologic features of interest in seismic data and designated generally as system 700. System 700 represents only one example of a suitable computing system architecture. Other arrangements and elements can be used in addition to or instead of those shown, and some elements may be omitted altogether for the sake of clarity. Many of the elements described herein are functional entities that may be implemented as discrete or distributed components or in conjunction with other components, and in any suitable combination and location.

Example system 700 includes computing environment 705, which includes a classification engine 720 and classified data storage 760. The classification engine 720 (including its components 722, 723, 724, 726, 728, 730 and 552) may be embodied as a set of compiled computer instructions or functions, program modules, computer software services, or an arrangement of processes carried out on one or more computer systems.

Continuing with FIG. 7, exemplary system 700 receives seismic data (e.g., data 711, 713, or 715) as input at data collection component 722. The system 700 processes seismic data to identify interesting features in the seismic data.

Three different groups of seismic data are shown being input to the data collection component 722. These groups illustrate that the system 700 can process a wide variety of seismic data. In one aspect, the seismic data are images of the results of two-dimensional seismic data acquisition and processing.

The first group of seismic data 710 are scanned. Generally, data 711 and the other data in the first group 710 originate as paper documents in a file, library, microfiche or some other physical storage. These documents are scanned to create a computer file containing an image of the seismic data. The data may be initially stored as an image in any number of file formats. The seismic images may be in black and white or include color.

The second group of seismic data 712, including data 713, are input to the data collection component 722 in the SEG-Y format. The SEG-Y format is a file format used for storing seismic. The format is governed by the SEG Technical Standards Committee. Associated file extensions include the .sgy and .segy extensions.

The third group of seismic data 714, including data 713, are in the RODE format, which is a file format for the storage of seismic data. The technology described herein is not limited to these three formats.

The classification engine 720 receives seismic data and converts it to a format that is more suitable for the classifier 552 to process. The classification engine 720 also reduces variance between different types of seismic data to give the machine classifier a more consistent input. The classification engine 720 includes data collection component 722, desaturation engine 723, anti-aliasing component 724, normalization component 726, resize engine 728, patch engine 730, and classifier 552.

Data collection component 722 receives the seismic data files and manages their processing by the other components of the classification engine 720. The data collection component 722 can communicate data files at various stages of processing to the other components. Once the seismic data file has been processed by the classifier 552 the results can be transferred to the classified data storage 760.

The desaturation engine 723 removes colors from seismic data when colors are present. Typically, some formats, such as SEGY files, do not include color and will not need to undergo the desaturation process. Colors in seismic images often relate to polarity or other features that do not directly relate to sought after geologic structures. Removing the colors gives the classifier 552 one less signal to consider and can produce a more accurate classification since color was found not to strongly correlate to identifying geologic structures of interest. Essentially, removing the colors removes noise from the image signal being processed by the classifier 552.

The anti-aliasing component 724 applies a Gaussian (or other anti-aliasing) filter to the seismic images before resizing, which helps to minimize the amount of artifacts present in the data during classification. The anti-alias filter need not be used if the image does not require resizing and is not susceptible to aliasing. In general, the anti-alias filter will blur sharp edges within the image and reduce overall noise within the image, and will prevent high frequencies from producing aliasing noise after resizing.

The normalization component 726 provides a contrast adjustment to some images. In one aspect, a histogram equalization process can be used to normalize the contrast in the image. Many of the images ultimately classified for interesting geological structures are scans of older seismic data that are old, low-contrast, and very noisy. In many cases, these data sets have been stored for years on microfiche slides. Thus, many of the scans are very low contrast with backgrounds and foregrounds that are both bright or both dark. The normalization component 726 makes contrast adjustments before further processing of the images takes place. Histogram equalization usually increases the global contrast of images, especially when the usable data of the image is represented by close contrast values. Through this adjustment, the intensities can be better distributed on the histogram. This allows for areas of lower local contrast to gain a higher contrast. Histogram equalization accomplishes this by effectively spreading out the intensity values to cover a specified range. This histogram equalization process can be adaptive or non-adaptive.

The resize engine 728 resizes the seismic data to common size. In one aspect, the entire image is resized in both dimensions, while retaining the aspect ratio of the original image. Pixel interpolation is one method of resizing.

The patch engine 730 generates seismic input instances that end up being the final input that is fed to the classifier 552 during operation. A purpose of the patch engine 730 is to generate input instances having consistent dimensions. For example, the seismic images in the input instances could be 512×512. The original seismic images can come in a variety of different sizes and multiple input instances can be generated from a single seismic image.

Different selection sizes are possible for input instances, but the selection size should be chosen to match the training data. For example, the selection size used by patch engine 250 and the patch engine 730 should be the same.

The classifier 552 receives a seismic data instance and produces an indication of geologic areas on interest. The classifier 552 may process a batch of seismic data patches. The output from the classifier 552 may be a raw inference in the form of several patches (with overlap) covering the extent of the input seismic image. These patches of raw inference can then be combined to produce an estimate of inference over the entire seismic image. This inference estimate may comprise an indication whether individual pixels represent a feature of interest. The inference estimate may be converted to a label, in that pixels that describe a feature of interest above a threshold probability may be assigned a 1 and pixels that do not describe a feature of interest will be below the threshold probability and will be assigned a zero. The output (inferred) label has the same dimensions as the image in the input instance. This allows the label to be overlaid on the image to indicate where areas of interest occur.

Other operations can be performed on the resulting "label" to produce a refined result indication. For example, Gaussian (or other) smoothing, threshold application (global or local), blob selection, blob merging, and boxing are possible operations. The optional steps can be applied to the raw inference based on its complexity and quality. More complex and lower quality sets of raw inference will typically require more operations.

Gaussian smoothing is applied to consolidate areas with coherent events, which might vary in probability over their area. The threshold can be adjusted as a parameter to influence the precision/recall tradeoff as it pertains to the detection of interesting geological features. A global or localized threshold can be used.

Blob selection is a process that can be used to remove blobs from the classified pixels (pixels to which the threshold has been applied). Blob merging expands the blobs through binary dilation until they have all been merged with at least one other blob. The boxing step takes all of the connected regions that are specified as geologically interesting (i.e., pixels with a one) and draws a rectangle around their maximal extents.

In one aspect, an outline of the rectangle superimposed on an image of the seismic data is the output to through a user interface. Alternatively, the rectangle could be a mostly transparent colored object indicating the area of interest.

Figure 8:
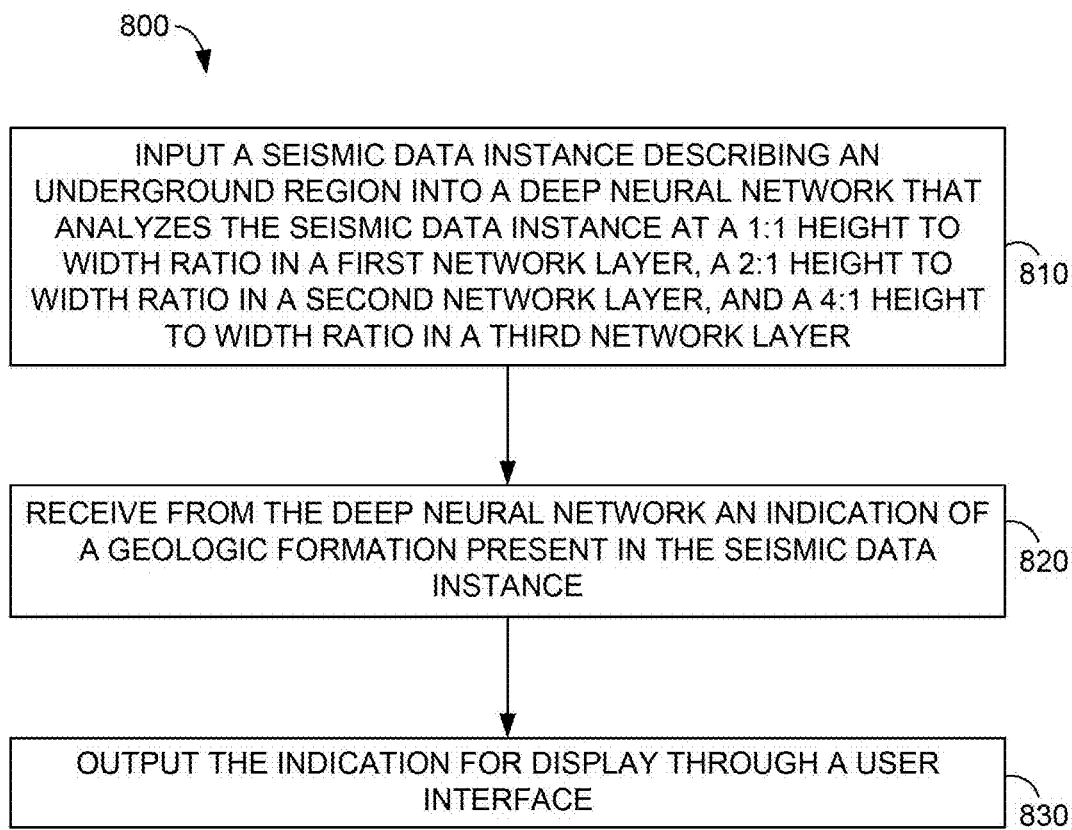
FIGS. 8, 9, and 10 are flow diagrams showing exemplary methods of identifying geologic formations within seismic data, in accordance with an aspect of the technology described herein.

Turning now to FIG. 8, a method 800 of identifying geologic formations within seismic data is provided. The method 800 may be performed using system 200, computing environment 500 and computing system 700.

At step 810, a seismic data instance describing an underground region is input into a deep neural network that analyzes the seismic data instance at a 1:1 height to width ratio in a first network layer, a 2:1 height to width ratio in a second network layer, and a 4:1 height to width ratio in a third network layer. The deep neural network could be similar to classifier 552 described previously. The deep neural network could be U-net as described with reference to FIG. 6.

In one aspect, the seismic data instances are images of two-dimensional seismic results. The seismic data file can be in any number of formats and have various origins. For example, the seismic data file could originate as paper documents in a file, library, or some other physical storage. These documents are scanned to create a computer file containing an image of the seismic data. The data may be initially stored as an image in any number of file formats. The seismic images may be in black and white or include color. The seismic file could also be in a format commonly used for seismic data, such as the SEG-Y format or the RODE format. The technology described herein is not limited to these three formats.

At step 820, an indication of a geologic formation present in the seismic data instance is receiving from the deep neural network. The output from the neural network may be a raw inference. The raw inference may comprise an indication whether individual pixels in the original input image represent a feature of interest. The raw inference may be converted to a label, in that pixels that describe a feature of interest with above a threshold probability may be assigned a 1 and pixels that do not describe a feature of interest with above the threshold probability a zero. The label has the same dimensions as the image in the input instance. This allows the label to be overlaid on the image to indicate where areas of interest occur.

Other operations can be performed on the resulting "label." For example, Gaussian smoothing, threshold application (global or local), blob selection, blob merging, and boxing are possible operations. The optional steps can be applied to the raw inference based on its complexity and quality. More complex and lower quality sets of raw inference will typically require more operations.

Gaussian (or other) smoothing is applied to consolidate areas with coherent events, which might vary in probability over their area. The threshold can be adjusted as a parameter to influence the precision/recall tradeoff as it pertains to the detection of interesting geological features. A global or localized threshold can be used.

Blob selection is a process that can be used to remove blobs from the classified pixels (pixels to which the threshold has been applied). Blob merging expands the blobs through binary dilation until they have all been merged with at least one other blob. The boxing step takes all of the connected regions that are specified as geologically interesting (i.e., pixels with a one) and draws a rectangle around their maximal extents.

In one aspect, an outline of the rectangle superimposed on an image of the seismic data is the output to through a user interface. Alternatively, the rectangle could be mostly transparent colored object indicating the area of interest.

At step 830, the indication is output for display through a user interface. The output can take a number of different forms. In one aspect, once the deep neural network has identified the geologic structures of interest, the area associated with the seismic data could be indicated on a map so that a geoscientist might more easily use the information. For example, seismic data taken from a seismic study in a first geographic location could be displayed at the location of the study on a map of the geographic location. If a specific geographic feature type is determined or other metadata associated with these features, this information can be plotted along with the map location of these features. Different colors could indicate different features or the lack of features. For example, a green dot could indicate seismic data with a feature of interest and a red dot could indicate seismic data that does not have a feature of interest.

Figure 9:
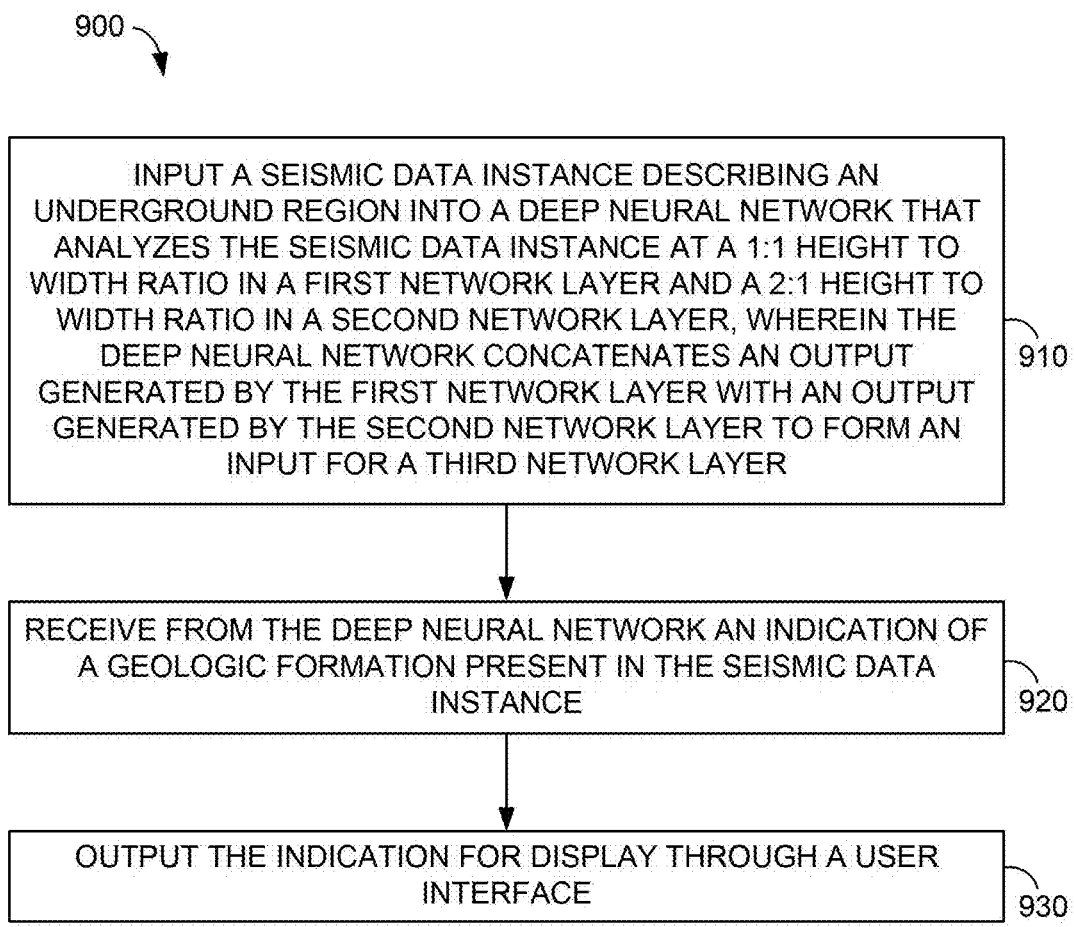

Turning now to FIG. 9, a method 900 of identifying geologic formations within seismic data is provided. The method 900 may be performed using system 200, computing environment 500 and computing system 700.

At step 910, a seismic data instance describing an underground region is input into a deep neural network that analyzes the seismic data instance at a 1:1 height to width ratio in a first network layer and a 2:1 height to width ratio in a second network layer. The deep neural network concatenates an output generated by the first network layer with an output generated by the second network layer to form an input for a third network layer. The deep neural network could be similar to classifier 552 described previously. The deep neural network could be U-net as described with reference to FIG. 6.

In one aspect, the seismic data instances are images of two-dimensional seismic results. The seismic data file can be in any number of formats and have various origins. For example, the seismic data file could originate as paper documents in a file, library, or some other physical storage. These documents are scanned to create a computer file containing an image of the seismic data. The data may be initially stored as an image in any number of file formats. The seismic images may be in black and white or include color. The seismic file could also be in a format commonly used for seismic data, such as the SEG-Y format or the RODE format. The technology described herein is not limited to these three formats.

At step 920, an indication of a geologic formation present in the seismic data instance is receiving from the deep neural network. The output from the neural network may be a raw inference. The raw inference may comprise an indication whether individual pixels in the original input image represent a feature of interest. The raw inference may be converted to a label, in that pixels that describe a feature of interest with above a threshold probability may be assigned a 1 and pixels that do not describe a feature of interest with above the threshold probability a zero. The label has the same dimensions as the image in the input instance. This allows the label to be overlaid on the image to indicate where areas of interest occur.

Other operations can be performed on the resulting "label". For example, Gaussian (or other) smoothing, threshold application (global or local), blob selection, blob merging, and boxing are possible operations. The optional steps can be applied to the raw inference based on its complexity and quality. More complex and lower quality sets of raw inference will typically require more operations.

Gaussian (or other) smoothing is applied to consolidate areas with coherent events, which might vary in probability over their area. The threshold can be adjusted as a parameter to influence the precision/recall tradeoff as it pertains to the detection of interesting geological features. A global or localized threshold can be used.

Blob selection is a process that can be used to remove blobs from the classified pixels (pixels to which the threshold has been applied). Blob merging expands the blobs through binary dilation until they have all been merged with at least one other blob. The boxing step takes all of the connected regions that are specified as geologically interesting (i.e., pixels with a one) and draws a rectangle around their maximal extents.

In one aspect, an outline of the rectangle superimposed on an image of the seismic data is the output to through a user interface. Alternatively, the rectangle could be mostly transparent colored object indicating the area of interest.

At step 930, the indication is output for display through a user interface. The output can take a number of different forms. In one aspect, once the deep neural network has identified the geologic structures of interest, the area associated with the seismic data could be indicated on a map so that a geoscientist might more easily use the information. For example, seismic data taken from a seismic study in a first geographic location could be displayed at the location of the study on a map of the geographic location. If a specific geographic feature type is determined or other metadata associated with these features, this information can be plotted along with the map location of these features. Different colors could indicate different features or the lack of features. For example, a green dot could indicate seismic data with a feature of interest and a red dot could indicate seismic data that does not have a feature of interest.

Figure 10:
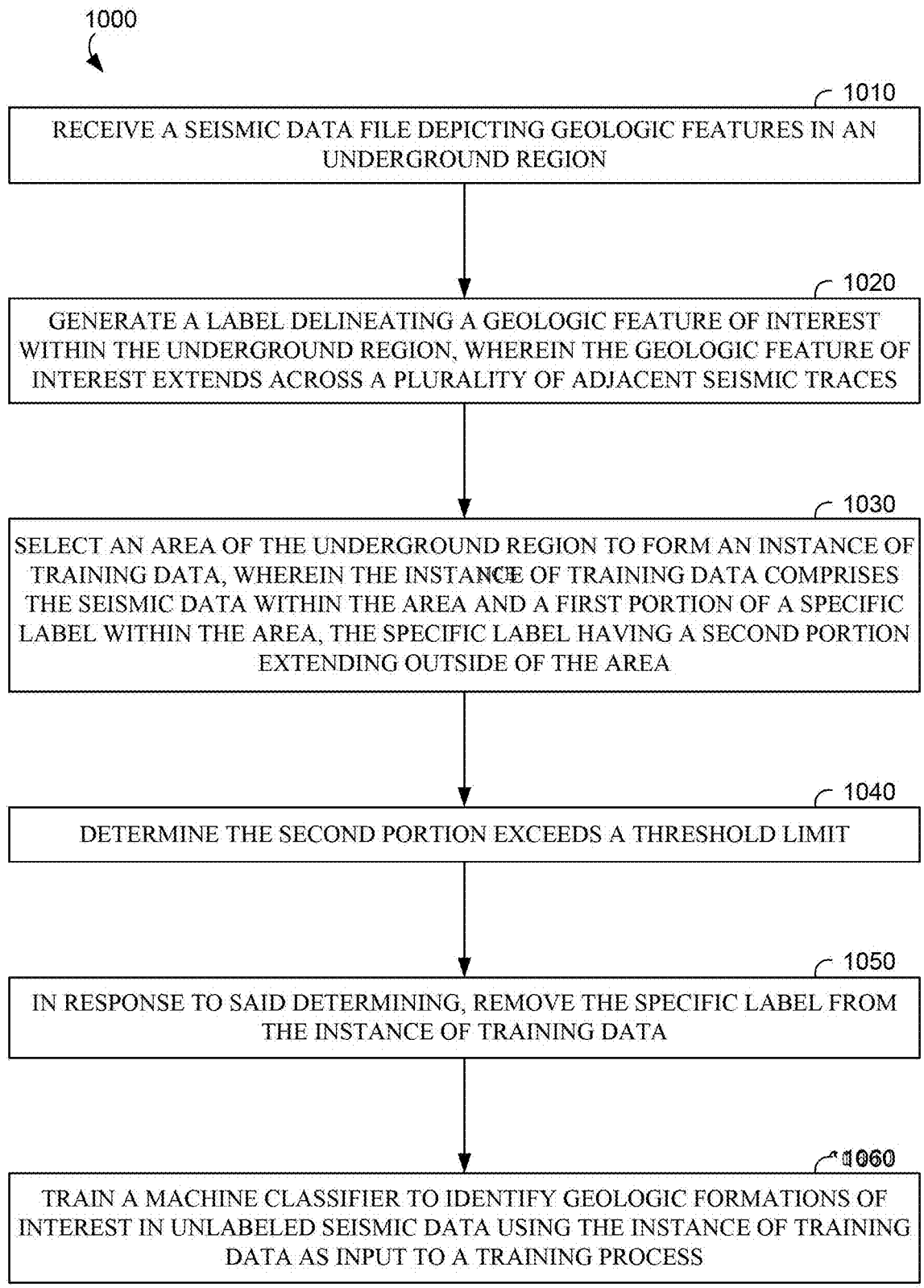

Turning now to FIG. 10, a method 1000 of identifying geologic formations within seismic data is provided. The method 1000 may be performed using system 200, computing environment 500, and computing system 700.

At step 1010, a seismic data file depicting geologic features in an underground region is received. In one aspect, the seismic data are images of two-dimensional seismic results. The seismic data file can be in any number of formats and have various origins. For example, the seismic data file could originate as paper documents in a file, library, or some other physical storage. These documents are scanned to create a computer file containing an image of the seismic data. The data may be initially stored as an image in any number of file formats. The seismic images may be in black and white or include color. The seismic file could also be in a format commonly used for seismic data, such as the SEG-Y format or the RODE format. The technology described herein is not limited to these three formats.

At step 1020, generating a label delineating a geologic feature of interest within the underground region. The geologic feature of interest extending across a plurality of adjacent seismic traces. This label can be added by person using an interface, such as the labeling engine described with reference to FIG. 2.

At step 1030, selecting an area of the underground region to form an instance of training data. The instance of training data comprises the seismic data within the area and a subset of the data which is labeled. The specific label also has a second portion extending outside of the area. The area can be selected in manner similar to that described with reference to the patch engine 250.

At step 1040, the second portion is determined to exceed a threshold limit.

At step 1050, in response to said determining, the specific label is removed from the instance of training data. The process of steps 1040 and 1050 has been described previous with reference to the patch engine 250.

At step 1060, a machine classifier is trained to identify geologic formations of interest in unlabeled seismic data using the instance of training data as input to a training process, as described with reference to FIG. 5.

Other processes may be performed on the label and seismic data, such as those processes described with reference to the pre-processing image or labeling engine 240.

The technology described herein may be described in the general context of computer code or machine-useable instructions, including computer-executable instructions such as program components, being executed by a computer or other machine, such as a personal data assistant, smart phone, tablet, or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices located on a vehicle, vehicle telematics devices, etc. Aspects of the technology described herein may also be practiced in distributed computing environments where tasks are performed by remote-processing devices that are linked through a communications network.

Computing architectures used herein may include a variety of computer-readable media. Computer-readable media can be any available media that can be accessed by computing architectures and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory and hundreds of terabytes in the form of persistent data storage such as HDDs and SSDs or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, cellular, Bluetooth, Wi-Fi, NFC, infrared, and other wireless media. Combinations of any of the above should also be included within the scope of computer-readable media.

APIs (Application Programming Interface) act as abstraction layers among different systems. For example, when two different applications interact, A and B, usually the data provided by application A does not conform to what is expected by application B. They can be used as a way to meet additional data structure requirements for application B, without the need to changing any functionality in application A. APIs are also commonly used as a way to decouple parts of the system.

The following example embodiments of the invention are also disclosed.

EMBODIMENT 1. A method of identifying geologic formations within seismic data, comprising: inputting a seismic data instance describing an underground region into a deep neural network that analyzes the seismic data instance at a 1:1 height to width ratio in a first network layer, a 2:1 height to width ratio in a second network layer, and a 4:1 height to width ratio in a third network layer; receiving from the deep neural network an indication of a geologic formation present in the seismic data instance; and outputting the indication for display through a user interface.

EMBODIMENT 2. The method of Embodiment 1, wherein the deep neural network is a convolutional neural network.

EMBODIMENT 3. The method of Embodiment 1 or 2, wherein the deep neural network comprises at least two 1×2 max pooling layers.

EMBODIMENT 4. The method of Embodiment 3, wherein the at least two 1×2 max pooling layers are located after a plurality of max pooling layers that generate outputs with a 1:1 height to width ratio.

EMBODIMENT 5. The method as in any one of the preceding embodiments, further comprising concatenating an output generated by the second network layer with an output generated by the third network layer to form an input for a fourth network layer.

EMBODIMENT 6. The method as in any one of the preceding embodiments, wherein the output from the third network layer undergoes a 2D transposition operation prior to being concatenated with the output generated by the second network layer.

EMBODIMENT 7. The method as in any one of the preceding embodiments, receiving a seismic data file depicting geologic features and selecting a portion of the data file to form the seismic data instance.

EMBODIMENT 8. A method of identifying geologic formations within seismic data, comprising: inputting a seismic data instance describing an underground region into a deep neural network that analyzes the seismic data instance at a 1:1 height to width ratio in a first network layer and a 2:1 height to width ratio in a second network layer, wherein the deep neural network concatenates an output generated by the first network layer with an output generated by the second network layer to form an input for a third network layer; receiving from the deep neural network an indication of a geologic formation present in the seismic data instance; and outputting the indication for display through a user interface.

EMBODIMENT 9. The method of Embodiment 8, wherein the output from the second network layer undergoes a 2D transposition operation prior to being concatenated with the output generated by the first network layer.

EMBODIMENT 10. The method as in Embodiment 8 or 9, wherein the deep neural network comprises a fourth network layer that analyzes the input at a 4:1 height to width ratio.

EMBODIMENT 11. The method of Embodiment 10, wherein the deep neural network comprises a fifth network layer that analyzes the output of the fourth network layer combined with the output of the second network layer.

EMBODIMENT 12. The method of Embodiment 8, 9, or 10, wherein the deep neural network comprises at least two 1×2 max pooling layers.

EMBODIMENT 13. The method of Embodiment 12, wherein the at least two 1×2 max pooling layers are located after a plurality of max pooling layers that generate outputs with a 1:1 height to width ratio.

EMBODIMENT 14. The method of any one of Embodiments 8, 9, 10, 11, 12, and 13, wherein the deep neural network is a U-net.

EMBODIMENT 15. A method of identifying geologic formations within seismic data comprising: receiving a seismic data file depicting geologic features in an underground region; generating a label delineating a geologic feature of interest within the underground region, wherein the geologic feature of interest extends across a plurality of adjacent seismic traces; selecting an area of the underground region to form an instance of training data, wherein the instance of training data comprises the seismic data within the area and a first portion of a specific label within the area, the specific label having a second portion extending outside of the area; determining the second portion exceeds a threshold limit; in response to said determining, removing the specific label from the instance of training data; and training a machine classifier to identify geologic formations of interest in unlabeled seismic data using the instance of training data as input to a training process.

EMBODIMENT 16. The method of Embodiment 15, wherein the machine classifier is a U-net.

EMBODIMENT 17. The method of Embodiment 15 or 16, wherein the machine classifier comprises a first 1×2 max pooling layer that generates a first tensor with a 2:1 height to width as a first output.

EMBODIMENT 18. The method as in any one of Embodiments 15, 16, and 17, wherein the machine classifier comprises a second 1×2 max pooling layer that generates a second tensor with a 4:1 height to width ratio as a second output.

EMBODIMENT 19. The method as in any one of Embodiments 15, 16, 17, and 18, wherein the method further comprises performing a left/right duplication on the seismic data file to generate a new instance of training data to be used in training the machine classifier.

EMBODIMENT 20. The method as in any one of Embodiments 15, 16, 18, and 19, wherein the method further comprises removing colors from the seismic data file.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A method of identifying geologic formations within seismic data, comprising:
    inputting a seismic data instance describing an underground region into a deep neural network that analyzes the seismic data instance at a 1:1 height to width ratio in a first network layer, a 2:1 height to width ratio in a second network layer, and a 4:1 height to width ratio in a third network layer to allow digestion of information from multiple aspect ratios simultaneously;
    receiving from the deep neural network an indication of a geologic formation present in the seismic data instance; and
    outputting the indication for display through a user interface.

2. The method of claim 1, further comprising concatenating an output generated by the second network layer with an output generated by the third network layer to form an input for a fourth network layer.

3. The method of claim 2, wherein the output from the third network layer undergoes a 2D transposition operation prior to being concatenated with the output generated by the second network layer.

4. The method of claim 1, wherein the deep neural network comprises at least two 1×2 max pooling layers.

5. The method of claim 4, wherein the at least two 1×2 max pooling layers are located after a plurality of max pooling layers that generate outputs with a 1:1 height to width ratio.

6. The method of claim 1, receiving a seismic data file depicting geologic features and selecting a portion of the seismic data file to form the seismic data instance.

7. The method of claim 6, wherein the method further comprises removing colors from the seismic data file.

8. The method of claim 1, wherein the deep neural network is a convolutional neural network.

9. The method of claim 1, wherein the deep neural network is a U-net.

\* \* \* \* \*